July 9, 1935.  A. L. WALLACE  2,007,355
METAL CUTTING TOOL
Filed July 28, 1933  2 Sheets-Sheet 1
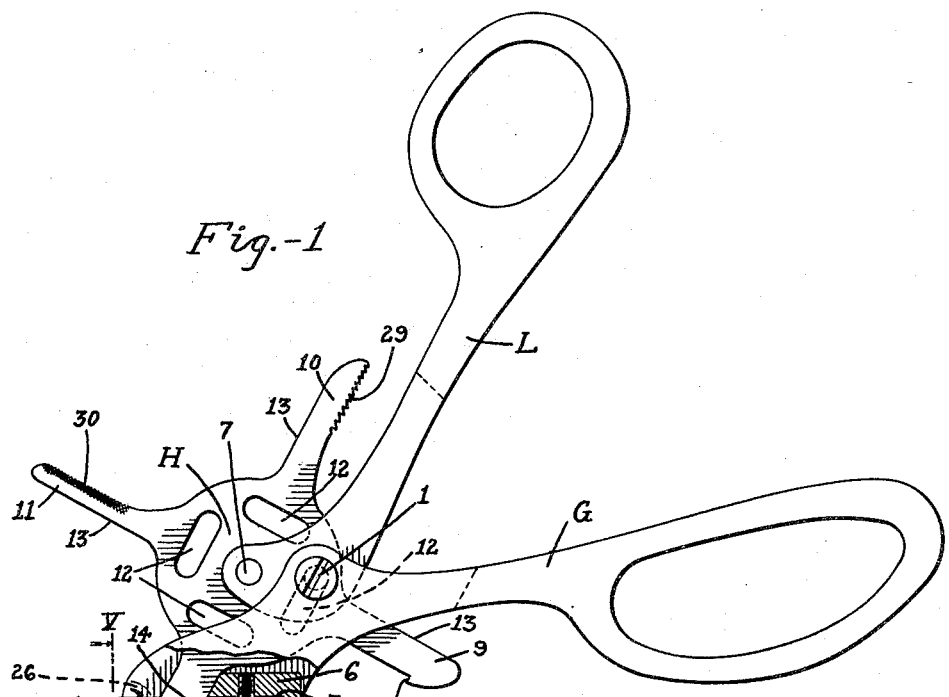
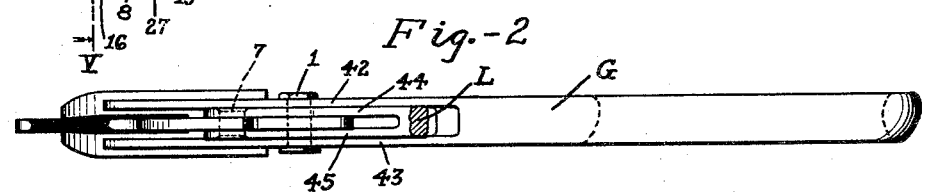
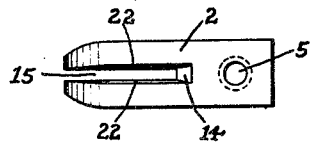
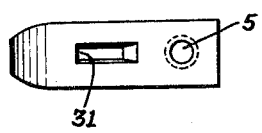
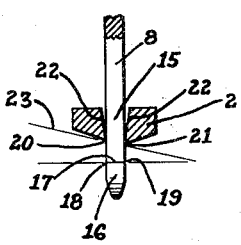
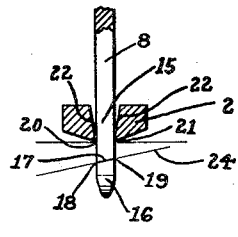
INVENTOR
Archibald L. Wallace
ATTORNEY July 9, 1935.　　　A. L. WALLACE　　　2,007,355
METAL CUTTING TOOL
Filed July 28, 1933　　　2 Sheets-Sheet 2
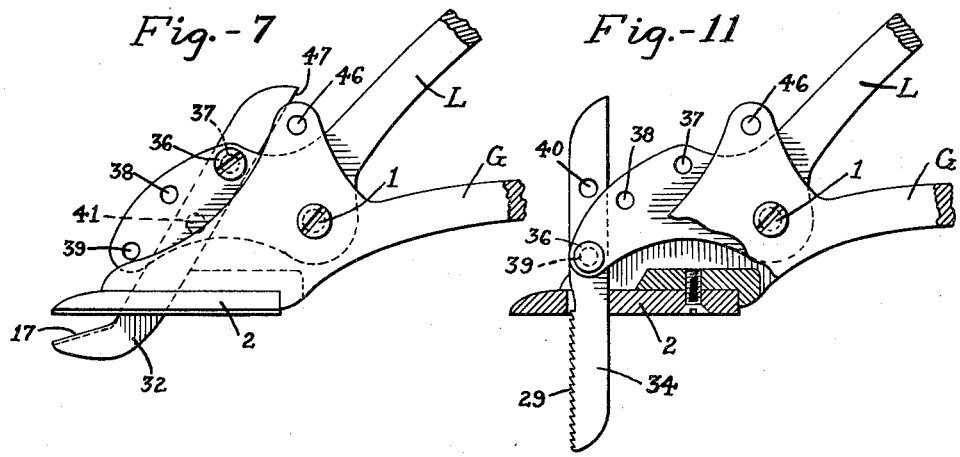
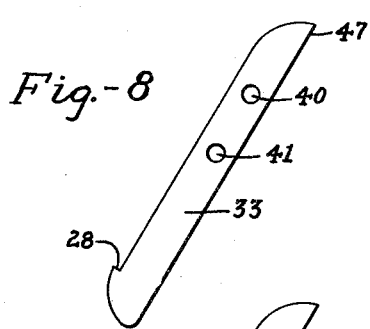
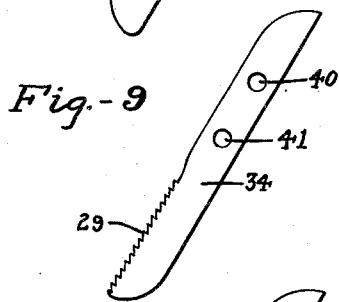
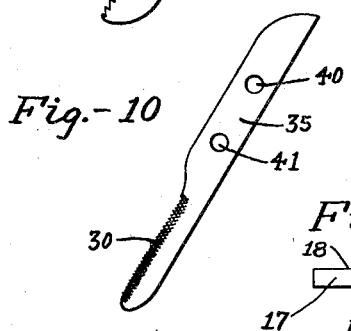
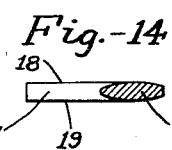
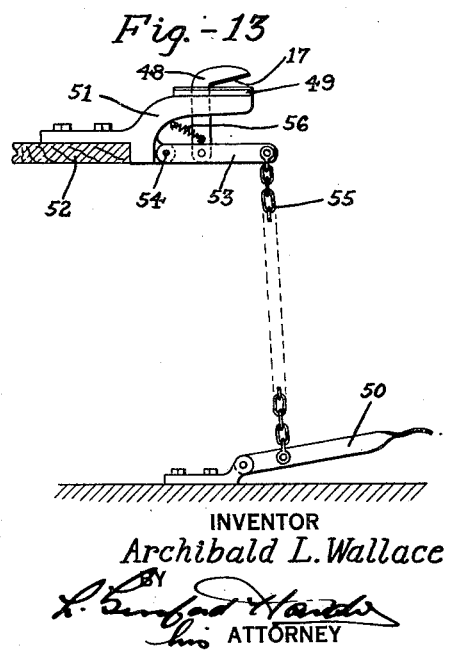
INVENTOR
Archibald L. Wallace
ATTORNEY Patented July 9, 1935

2,007,355

UNITED STATES PATENT OFFICE 2,007,355

METAL CUTTING TOOL

Archibald L. Wallace, Long Island, N. Y.

Application July 28, 1933, Serial No. 682,550

8 Claims. (Cl. 164—81)

This invention relates to a metal cutting tool, and an object of the invention is to provide a simple, practical and efficient tool by the use of which sheet metal may be readily cut along lines either straight or curved as required.

A further object is to so construct the tool that the cutting operation performed thereby may be effected with great ease and may extend along lines sharply curved if necessary.

A further object is to so construct the tool that it may include several selectively usable cutters or cutter blades.

A further object is to so construct the tool that during its operation it will remove a small portion of the metal, and to so construct the tool as to facilitate the easy removal of this portion of the metal, and thereby prevent clogging or like interference with the easy progress of the tool along the line to be cut through the work.

A further object is to so construct the tool that it will provide for the selective use of different degrees of leverage and different distances of movement of the cutter blades.

A further object is to so construct the tool that the different cutter blades employed may be easily inserted or removed and so that they may be operatively connected in different relative positions in the tool structure for best accomplishing their different purposes.

A further object is to provide means adapting certain features of this tool for use as a permanently mounted tool adapted to be operated preferably by a foot lever during the metal cutting operation.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view, partly in section, illustrating a tool constructed in accordance with this invention.

Fig. 2 is a top plan view of the part seen in Fig. 1.

Fig. 3 is a top plan view of the cutter plate shown in Figs. 1 and 2.

Fig. 4 is a similar view of a cutter plate such as would be used when a different cutter blade is being employed.

Fig. 5 is an enlarged fragmentary detail sectional view substantially upon the plane of line V—V of Fig. 1.

Fig. 6 is a similar detail sectional view illustrating a modification of the parts shown in Fig. 5.

Fig. 7 is a side elevational view of a slightly modified form of tool, the operating handles being broken off for the saving of space.

Figs. 8, 9 and 10 are detail side elevational views of different separately formed cutters intended for use in the structure shown in Fig. 7.

Fig. 11 is a view similar to Fig. 7, but being shown partly in vertical section and illustrating the use of the cutter shown in Fig. 9.

Fig. 12 is a view similar to Figs. 3 and 4 but illustrating the cutter plate shown in Fig. 11.

Fig. 13 is a side elevational view of a tool embodying certain features of this invention and adapted for being mounted stationary so that in use the work will be fed to the tool instead of the tool being fed to the work as contemplated in other figures, and Fig. 14 is a detail transverse sectional view through any one of the cutter blades employed.

Referring to the drawings for describing in detail the exemplary structures disclosed therein, and referring first to the structure Figs. 1 and 2, the reference characters L and G indicate two handle members pivotally connected together as by a pivot pin I so that the two handles may be manually operated by an operator's hand in the same manner as is common to the use of ordinary scissors or tin snips.

At its lower end the handle G has removably connected therewith the cutter plate 2 which in practice is preferably formed of hard steel. It may be removably mounted by any suitable means such for instance as by being received in a seat of the handle member G and by being held by a screw as 4 extending through an aperture 5 of the cutter plate and threaded into a cross portion 6 of the handle member G.

The purpose of making the cutter plate readily detachable is to provide for the easy and convenient substitution of cutter plates which differ slightly in shape and size as may be required in connection with the cutting of different pieces of work and for the use of different cutter blades.

At its lower end the handle L has pivotally connected therewith as at 7 a separately formed cutter member H which is formed with a plurality of different extensions as 8, 9, 10 and 11 spaced apart equi-distant about the pivot 7 and each being formed to constitute a separately and selectively usable cutter blade. Whenever it is desired to use one of these cutter blades other than the one already in operative relation with the cutter plate it is simply necessary to remove the pivot pin 1, lift out the handle L with the cutter member H, rotate the cutter member H to the desired extent and then return the handle L into connection with the handle G so that the newly selected cutter blade will now stand in its proper relation to the cutter plate.

If a different cutter plate is required for use in connection with the newly selected cutter blade it is simply necessary to remove the unusable cutter plate and substitute therefor a cutter plate of the proper type to cooperate with the newly selected cutter blade.

The cutter member H is formed with a plurality of slots as 12—12 through which the pivot pin 1 extends when the parts are assembled, said slots serving the double purpose of providing clearance for up and down movements of the cutter blades when in use and for preventing clock-wise rotation, Fig. 1, of the cutter member H at all times and particularly when the handles L and G are in open position.

Counter clock-wise rotation of the cutter member H is positively prevented during cutting use of the tool by engagement of the rear edge portion as 13 of the cutter blades against the inner end wall surface 14 of the blade receiving slot 15 of the cutter plate.

The cutter blade 8, shown in operative position in Fig. 1, and illustrated in detail in Figs. 5 and 6 has a laterally extending foot 16, the upper edge surface as 17 of which provides at its opposite longitudinal edges or corners as 18 and 19 cutting edges which in concert with the cutting corners 20 and 21 of the cutter plate 2 operate to shear through the work, the surface 17 serving to force upwardly the sheared out portion of the work and to force said portion upwardly and discharge it out of the slot 15.

The opposite longitudinal side walls as 22—22 of the slot 15 preferably diverge upwardly away from each other so as to afford clearance for the cut out strip of sheet metal from the work.

As a means to provide for efficient clearance of the cut out strip of sheet metal from the work as said strip is being cut out from the work and forced upwardly between the walls 22—22 of the slot 15, the cutting edges 18 and 19 and the cutting edges 20 and 21 are positioned with respect to each other so as to perform the cutting operation at one side of the blade as between the edges 19 and 21 slightly in advance of the cutting operation at the opposite side as between the edges 18 and 20 so that thus the cut out strip of sheet metal from the work is given a slight tilt or twist as it is being cut and is made thereby to free itself from strong frictional contact of wedging engagement between the opposite walls 22—22.

In the arrangement shown in Fig. 5 the cutting of one edge ahead of the opposite edge is effected by so shaping the cutter plate 2 that its cutting edge 21 is relatively lower than its cutting edge 20, as indicated by the inclined line 23 which touches the two cutting edges, and by making the surface 17 transversely horizontal so that the cutting edges 18 and 19 are on a common horizontal plane.

In the arrangement shown in Fig. 6 the cutting of one edge ahead of the opposite edge is effected by so inclining the upper surface 17 that its cutting edge 18 is relatively lower than its cutting edge 19, as indicated by the inclined line 24 which touches the two cutting edges, and by making the two cutting edges 20 and 21 of the cutter plate on a common horizontal plane.

The under surface of the cutter plate is preferably bevelled off upwardly from the cutting edges 20 and 21, substantially as indicated, in order to at once give sharpness to the cutting edges 20 and 21 and to afford a suitable clearance for the work at opposite sides of the blade. The bevelled under surface of the cutter plate also permits a desirably slight lateral tilting of the tool without materially altering the cutting operation.

It will be noted further that the position of the end wall 14 of slot 15, with respect to the pivot 1, is such that the cutter blade extends normally on an incline downwardly and forwardly from the pivot 7 and that the relation of the pivots 1 and 7 is such as to not materially disturb the angle of incline of the blade during operation of the handles L and G.

The handle G, which is the lower handle and stands nearer to the work, is intended to remain substantially motionless during use of the device while the handle L is intended to be swung downwardly toward the handle G, and it will be seen that when the handle L thus swings it will move the pivot 7 upwardly and thus draw up the blade 8 while said blade still remains in its inclined relationship. This is important as it improves the action of the blade in cutting through the work. As the blade moves upwardly through the work, indicated by the reference character 25, the foot 16 not only moves upwardly to carry its cutting edges 18 and 19 above the cutting edges 20 and 21 of the cutter plate but it at the same time has a slight rearward sliding movement along the under-surface of the piece or strip, as 26, of sheet metal which is being cut out from the work, the degree of this sliding movement depending upon the angle of inclination of the upward movement of the blade, the rearward sliding movement of the cutting edges 18 and 19 along the strip 26 greatly assists in producing a clean shearing action of said cutting edges and also in drawing the strip 26 upwardly and through the space between the walls 22—22 of the slot 15 of the cutter plate.

During the cutting operation the operator holds the cutter plate substantially stationary while lifting the cutter blade, the shearing action of the surface 17 of the blade against the work serving at this time to hold the rear edge 13 of the blade in close sliding contact with the end wall surface 14 of slot 15. When the operator has moved the handle L downward to its full extent, and the blade 8 correspondingly up to its limit, he then returns the handle L upwardly and thus moves the blade down again meanwhile sliding the tool forwardly with the under surface of the cutter plate resting flat upon the upper surface of the work. The tool is then in position for another lifting movement of the blade, and this operation continues until the full length of the cut through the work is completed, it being apparent that during the time while the blade 8 is in its lowered position there extends through the work only the narrow portion as 27 of the blade which lies just above the upper end of the shearing surface 17 and that by reason of this fact the tool may be swung laterally about the portion 27 as a pivot thereby to enable the cutting operation to follow almost any curvature of line along the work.

Obviously the portion 27 may be tapered off toward either or both its front or rear edges as shown in Fig. 14, in order to facilitate the more easy turning of the portion 27 within the slot formed through the work by removal of strip 26 from the work if desired.

When at any time it is desirable to draw the tool rearwardly away from the strip 16 being cut from the work this is facilitated by reason of the fact that the slot 12 by standing in engagement with the pivot pin 1 prevents the foot portion 16 of the blade 8 from swinging up and becoming friction bound between the walls of the slot in the work.

The selectively usable cutter blade 9, instead of having a shearing surface 17, is formed with only a small biting ledge as 28 and is intended for use in cutting through sheet metal of so great thickness that the shearing edge 17 of blade 8 would be impractical of use. The ledge 28 is intended to bite off a small chip from the work each time the blade 9 is drawn up through the work. Otherwise the use of blade 9 is similar to that of blade 8.

The selectively usable cutter blade 10 is designed as a saw, being formed with saw teeth as 29 thereon in the same relative location as the ledge 28 of blade 9. The blade 10 is intended for sawing through the work as will be readily understood, the teeth 29 biting out portions of the work each time the blade is forced upwardly.

The selectively usable cutter blade 11 is designed as a file, being formed with a file surface as 30 thereon in the same relative location as the saw teeth 29 of blade 10. The blade 11 is intended for filing its way through the work as will be readily understood, the file surface 30 filing out portions of the work each time the file is moved through the work.

The cutter plate illustrated in Fig. 4 is adapted for use with either of the blades 9, 10 or 11, and particularly with the blade 9 since it provides a front wall portion as 31 the lower edge corner of which is positioned to constitute a rest for the work at a proper location to support the work as the ledge 28 moves upwardly in biting off a chip from the work.

It will be noted that the slots 12—12 are associated with the cutter blades 8, 9, 10 and 11 respectively so that regardless of which of the blades is being used at any particular time there will be a slot 12 in a proper relative position to receive and co-operate with the pivot 1 to admit the pivot pin and to prevent clock-wise rotation of the cutter member H.

In the modification Fig. 7 the structure and manner of use is substantially the same as already described except that in this modification it is proposed that the several cutter blades here indicated by the reference numerals 32, 33, 34 and 35, corresponding respectively with the cutter blades 8, 9, 10 and 11, shall be formed as separately attachable and detachable elements instead of being made as extensions from the single cutter member H above described.

This modification also proposes that the pivotal mounting of the cutter blades, corresponding with the pivotal mounting 7 of the previous structure, may be made adjustable with respect to the pivot 1, thereby providing for different angles and extents of movement of the blades as may be preferred for cutting a path through pieces of work of different characters. The pivotal connection between the handle L and the blade 32 is shown to consist of a removably mounted pivot pin 36. The handle L is provided with a plurality of different apertures as 37, 38 and 39 and each of the blades 32, 33, 34 and 35 is provided with a plurality of different apertures as 40 and 41 all for selective use, any one of the apertures of the handle to mate with any one of the apertures of the blades best suited to the use of the particular blade in operating upon the particular piece of work in hand.

It is noted that in using blade 32 with its aperture 40 mating the aperture 37 of the operating handle the blade 32 stands in substantially the same position as does the blade 8 as illustrated in Fig. 1, and that the blade 32 is adapted for operation upon the work in the same manner as described with respect to Fig. 1.

It is also to be noted that the apertures 37, 38 and 39 of the handle L are spaced at different distances away from the pivot 1, thereby providing not only for a selectively usable variation in the angle of travel of the blade but also a selectively usable variation in the distance of travel of the blade.

In the illustration Fig. 11 the structure is the same as shown in Fig. 7 except that in Fig. 11 the blade 34 is shown mounted in the aperture 39 of the operating handle and it will be noted that the aperture 39, being furthest spaced from the pivot 1, provides for a considerably greater distance of travel of the blade up and down through the cutter plate 2 than if said blades were connected by means of either the aperture 37 or 38 of the handle L.

The cutter plate 2 as illustrated in Figs. 11 and 12 is similar to the cutter plates previously described but is particularly adapted for co-operation with a blade so connected with the handle L as to move at a substantially noninclined relation through the cutter plate.

In each of the structures illustrated the handle G is preferably formed with opposite spaced wall parts as 42 and 43 between which the handle L is positioned, and the handle L is likewise provided with opposite spaced wall parts as 44 and 45 between which the cutter member or blade is pivotally mounted, all as most clearly seen in the illustration Fig. 2.

In the modified structure shown in Fig. 7 a cross pin 46 is provided, extending between the spaced walls 42 and 43 of the handle member G and adapted for engagement by an upwardly extending portion as 47 of the cutter blade to limit clock-wise swinging of the cutter blade about the pivot pin 36 for the same reason as described with reference to pivot pin 1 and slots 12—12 of the structure Fig. 1.

In the modified arrangement shown in Fig. 13 it is intended that the cutter blade as 48 illustrated therein may be the same as the cutter blade 8 or 32 previously described, and that the cutter plate as 49 shall be the same as the cutter plate 2 already described. Also that the cutter blade and cutter plate employed may correspond with any one of the selectively usable blades and plates heretofore described, the purpose of the illustration Fig. 13 being to show adaptation of these blades and plates for use in association with a foot lever as 50 by which to operate the blade.

In the illustration Fig. 13 the cutter plate 49 is shown as being mounted in a stationary position upon bracket 51 bolted to a table or the like 52, and the blade 48 is shown as being pivotally connected with a lever 53 which in turn is pivotally mounted as at 54 upon the bracket 51 and has connected to its outer end a pull chain 55 extending downwardly to the foot lever 50 so that depression of the lever 50 will draw down the blade 48 through the cutter plate 49 to cut a path through the work. It is intended that the work in this instance shall be advanced by the operator toward the tool instead of the tool being advanced toward the work as in the previous structures.

A suitable tension spring as 56 may be employed to hold the blade 48 in a normal elevated position as illustrated.

In some instances it may be desirable to make the cutter blade rigid with the handle L instead of pivotally connected therewith as above described, the cutter plate employed in that case of course having its opening or slot 15 formed to accommodate the required movement of the blade incident to the swinging of the handle L.

The pivotal connection of the cutter blades with the handle L in all of the structures has the advantage of providing a certain amount of free movement of the blade with respect to the handle, particularly in directions rotatably of the pivotal connection, which free movement may be taken advantage of at all times by the operator to wiggle the cutter blade in a somewhat haphazard fashion with respect to the work for thereby facilitating advance and retreat of the cutter blade with respect to the work by breaking the tight frictional grip which may at times occur between the opposite side surfaces of the cutter blade and the opposing surfaces of the work while the tool is in use.

The invention as herein illustrated and described provides a tool which is simple and practical, one which may be manufactured at small cost and which includes selectively usable elements adapting it for cutting a pathway through various kinds of work and along lines either straight, angular or curved.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A metal cutting tool comprising a cutter plate, a cutter blade mounted for movement through an opening of the plate and through a piece of work in engagement with the plate, the blade having a pair of cutting edges thereon spaced apart co-operative with a pair of similarly spaced cutting edges at opposite sides respectively of said opening thereby to produce parallel shear cuts through the work, the two pairs of cutting edges collectively being thus adapted for cutting out a strip from the work, and means by which to move the blade back and forth through the plate and the work along a path inclined with respect to the work backwardly away from the point of shearing contact between the blade and the work.

2. A metal cutting tool comprising a cutter plate, a cutter blade mounted for movement through an opening of the plate and through a piece of work in engagement with the plate, the blade having a pair of cutting edges thereon spaced apart co-operative with a pair of similarly spaced cutting edges at opposite sides respectively of said opening thereby to produce parallel shear cuts through the work, the two pairs of cutting edges collectively being thus adapted for cutting out a strip from the work, and means by which to move the blade back and forth through the plate and the work along a path inclining upwardly and backwardly from the point of shear.

3. A metal cutting tool comprising a cutter plate, a cutter blade mounted for movement through an opening of the plate and through a piece of work in engagement with the plate, the blade having a pair of cutting edges thereon spaced apart co-operative with a pair of similarly spaced cutting edges at opposite sides respectively of said opening thereby to produce parallel shear cuts through the work, the two pairs of cutting edges collectively being thus adapted for cutting out a strip from the work, and a pair of manually operable handles connected with said plate and blade respectively by which to move the blade back and forth through the plate and work along a path inclining upwardly and backwardly from the point of shear.

4. A metal cutting tool comprising a cutter plate, a cutter blade mounted for movement through an opening of the blade and through a piece of work in engagement with the plate, means by which to move the blade back and forth through the plate and the work, the blade having an upwardly facing surface portion terminating in spaced cutting edges at opposite sides of the blade co-operative with a pair of similarly spaced cutting edges at opposite sides respectively of said opening thereby to produce parallel shear cuts through the work, and the cutting edges of the plate being elevated one with respect to the other in the direction of movement of the blade through said opening.

5. A metal cutting tool comprising a cutter plate, a cutter member, a pair of handles for carrying said plate and member respectively, means pivotally connecting said handles together so that pivotal movement of one of the handles with respect to the other will move the cutter member with respect to the plate, means by which the cutter member is pivotally mounted upon its carrying handle, and said cutter member having a plurality of blade forming extensions thereon radiating from the pivotal center of said cutter member adapted thereby for selective use in co-operation with the cutter plate, together with means to restrict rotary movement of the cutter member with respect to its carrying handle in use.

6. A metal cutting tool comprising a cutter plate, a cutter blade, a pair of handles for carrying said plate and blade respectively, means pivotally connecting said handles together so that pivotal movement of one of the handles with respect to the other will move the cutter blade with respect to the plate for performing the cutting operation, a plurality of other cutter plates, a plurality of other cutter blades, and means by which said blades selectively may be detachably connected with one of said handles and means whereby said plates selectively may be detachably connected with the other handle.

7. A metal cutting tool comprising a cutter plate, a cutter blade, a pair of handles for carrying said plate and blades respectively, means pivotally connecting said handles together so that pivotal movement of one of the handles with respect to the other will move the cutter blade with respect to the plate for performing the cutting operation, and at least one of said handles having a plurality of prepared localities spaced apart thereon for the attachment of its respective cutter part thereto.

8. A metal cutting tool comprising a cutter plate, a cutter blade, a pair of handles for carrying said plate and blade respectively, pivot means extending between said handles so that pivotal movement of one of the handles with respect to the other will move the cutter blade with respect to the plate for performing the cutting operation, and the blade carrying handle having a plurality of prepared localities thereon spaced progressively at different distances from said pivot means adapted for selective use in attaching the blade to said handle.

ARCHIBALD L. WALLACE.